Patented Oct. 10, 1933

1,929,847

UNITED STATES PATENT OFFICE 1,929,847

PRODUCTION OF CONDENSATION PRODUCTS OF 1.5-DIHALOGEN ANTHRAQUINONES

Paul Nawiasky and Georg Kretzschmar, Ludwigshafen-on-the-Rhine, Germany, assignors to General Aniline Works Inc., New York, N. Y., a corporation of Delaware No Drawing. Application June 17, 1929, Serial No. 371,714, and in Germany June 29, 1928

3 Claims. (Cl. 260—60)

The present invention relates to the manufacture and production of condensation products of 1.5-dihalogen anthraquinone and amino aryl-o-carboxylic acids.

It is already known that condensation products which are important, for example, as intermediate products for the manufacture of diacridones of the anthraquinone series suitable as vat dyestuffs, can be obtained by the condensation of anthraquinone derivatives containing exchangeable negative substituents in the 1.5 positions with amino aryl-o-carboxylic acids.

We have now found that condensation products of the said type derived from 1.5 dihalogen anthraquinones are obtained in a particularly advantageous manner by carrying out the condensation in the presence of alcohols and at temperatures above 150° centigrade and under pressure, if necessary. The process in accordance with the present invention results not only in better yields, but also in purer products than those which are obtained by employing other solvents or diluents.

The following examples will further illustrate how the said invention is carried out in practice but the invention is not restricted to these examples. The parts are by weight.

Example 1

1500 parts of butyl alcohol, 150 parts of 1.5-dichlor anthraquinone, 4 parts of copper oxide and 450 parts of potassium anthranilate are heated at from 150° to 180° centigrade for 5 hours in an autoclave, while stirring. After cooling the potassium salt which separates out, is filtered off by suction. By acidification a crude 1.5-dianthranilo-anthraquinone is obtained in a much better yield and in a much purer state than that obtained by the method described in the literature (see Ullmann and Ochsner, Liebigs Annalen 391 page 9) with the employment of nitrobenzene as the solvent.

The superiority of the product obtained in accordance with the present invention is especially evident in the conversion of the same into the corresponding anthraquinone diacridone. For this purpose, for example, 10 parts of crude 1.5-dianthranilo-anthraquinone are dissolved in 40 parts of sulphuric acid monohydrate, and after adding 60 parts of chlorsulphonic acid the whole is warmed for half an hour at 30° centigrade and the dyestuff precipitated in the form of its sulphate by carefully adding from 15 to 20 parts of 50 per cent sulphuric acid. The diacridone is obtained in a better yield and of greater purity from the 1.5-dianthranilo-anthraquinone prepared in accordance with the present invention than from that prepared according to any process previously known. The closing of the ring may also be effected with equally favourable results in indifferent solvents, for example by means of phosphorus oxychloride, and the dyestuff may be purified by fractional precipitation from sulphuric acid.

Ethyl alcohol may be employed with equal advantage instead of butyl alcohol.

Example 2

A mixture of 33 parts of 1.5-dichlor anthraquinone, 83 parts of potassium anthranilate, 10 parts of anhydrous potassium acetate, 1.5 parts of copper acetate, 0.6 part of copper oxide and 450 parts of benzyl alcohol are stirred for 5 hours at 170° centigrade; part of the benzyl alcohol is then distilled off in vacuo, the whole then treated with 400 parts of monochlorbenzene, filtered by suction and worked up in the usual manner. The potassium salt of 1.5-dianthranilo-anthraquinone so obtained is practically pure and may be advantageously converted into the diacridone as described in Example 1.

Example 3

A mixture of 60 parts of 1.5-dichlor anthraquinone, 180 parts of sodium 5.chlor anthranilate, 2 parts of copper oxide and 600 parts of butyl alcohol is heated at from 170° to 175° C. and stirred for from 5 to 6 hours in an autoclave. The reaction mixture is then allowed to cool and worked up as described in Example 1.

We claim:

1. A process of producing anthraquinone derivatives which comprises condensing a 1.5-dihalogen-anthraquinone with an amino-phenyl-o-carboxylic acid in the presence of a normally liquid saturated alcohol at temperatures above 150° C.

2. A process of producing anthraquinone derivatives which comprises condensing a 1.5-dichlor anthraquinone with an amino-phenyl-o-carboxylic acid in the presence of a normally liquid saturated alcohol at temperatures above 150° C.

3. A process of producing anthraquinone derivatives which comprises heating a 1.5-dichlor anthraquinone with an anthranilic acid in the presence of butyl alcohol in a closed vessel to temperatures between 150° and 180° C.

PAUL NAWIASKY.
GEORG KRETZSCHMAR.